United States Patent
Rakshit

(10) Patent No.: US 10,067,977 B2
(45) Date of Patent: Sep. 4, 2018

(54) WEBPAGE CONTENT SEARCH

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/241,246

(22) Filed: Aug. 19, 2016

(65) Prior Publication Data

US 2016/0357811 A1  Dec. 8, 2016

Related U.S. Application Data

(63) Continuation of application No. 14/633,245, filed on Feb. 27, 2015, now Pat. No. 9,471,703, which is a continuation of application No. 12/949,927, filed on Nov. 19, 2010, now Pat. No. 9,069,874.

(51) Int. Cl.
  *G06F 7/00* (2006.01)
  *G06F 17/30* (2006.01)
  *H04L 29/06* (2006.01)

(52) U.S. Cl.
  CPC .. *G06F 17/30424* (2013.01); *G06F 17/30887* (2013.01); *G06F 17/30896* (2013.01); *H04L 63/102* (2013.01)

(58) Field of Classification Search
  CPC ............. G06F 17/30864; G06F 21/577; G06F 17/30896
  USPC .................................................. 707/730, 771
  See application file for complete search history.

(56) References Cited

U.S. PATENT DOCUMENTS

| | | |
|---|---|---|
| 6,442,576 B1 | 8/2002 | Edelman et al. |
| 6,996,845 B1 | 2/2006 | Hurst et al. |
| 7,346,605 B1 | 3/2008 | Hepworth et al. |
| 2002/0129053 A1 | 9/2002 | Chan et al. |
| 2007/0061410 A1 | 3/2007 | Alperin |
| 2009/0063460 A1 | 3/2009 | Selberg |
| 2012/0131053 A1 | 5/2012 | Rakshit |

FOREIGN PATENT DOCUMENTS

CN     1808437     7/2006

OTHER PUBLICATIONS

Loizides et al.; The Myth of Find: User Behaviour and Attitudes Towards the Basic Search Feature; JCDL '08, Jun. 16-20, 2008; 4 pages.
Miasavc (eHow Member); How to Find Words in a Web Page Fast and Easy; Retrieved from the Internet URL http://www.ehow.com/print/how_4702678_words-fast-east.html; retrieved from the Internet May 24, 2010; 2 pages.

*Primary Examiner* — Boris Gorney
*Assistant Examiner* — Christy Y Kim
(74) *Attorney, Agent, or Firm* — Schmeiser, Olsen & Watts; John Pivnichny

(57) ABSTRACT

An information locating method and system. The method includes presenting by a computer processor, a Webpage to a user. The computer processor receives a search command for performing a search function associated with the Webpage. In response, the computer processor: analyzes source code of the Webpage; downloads and analyzes files associated with the Webpage; and analyzes viewable information of the Webpage. The computer processor locates specified information associated with the Webpage.

19 Claims, 6 Drawing Sheets

```
Original Source
File Edit Format

1555    <td/>
1556  </tr>
1557  </tr>
1558    <td>
1559    <select name="searchBy" id="search-type">
1560       <option value=Department number">
1561          Department number
1562       </option>
1563          Internet address
1564       </option>
1565       <option value="Job responsibilities>
1566          Job responsibilities
1567       </option>
1568       <optio value="name" selected="selected">
1569          Name
1570       </option>
1571       <option value="
1572          Notes mail
1573       </option>
1574       <option value="                numbers">
1575          Phone numbers
1576       </option>
1577       <option value="Serial number>
1578          serial number
1579       </option>
1580       <option value="Skills">
1581          Skills
1582
```

402 points to the `<select>` block. 404 highlights "Phone".

FIG. 4

WEBPAGE CONTENT SEARCH

This application is a continuation application claiming priority to Ser. No. 14/633,245 filed Feb. 27, 2015, now U.S. Pat. No. 9,471,703 issued Oct. 18, 2016, which is a continuation application claiming priority to Ser. No. 12/949,927 filed Nov. 19, 2010 now U.S. Pat. No. 9,069,874 issued Jun. 30, 2015.

FIELD

The present invention relates to a method and associated system for locating content associate with a Webpage.

BACKGROUND

Locating data typically comprises an inefficient process with little flexibility. Accordingly, there exists a need in the art to overcome the deficiencies and limitations described herein above.

SUMMARY

The present invention provides a method comprising: presenting, by a computer processor of a computing system in response to a command from a user, a Webpage to the user; receiving, by the computer processor from the user, a search command for performing a search function associated with the Webpage; first analyzing, by the computer processor based on the search command, source code of the Webpage; identifying, by the computer processor, a specified folder comprising files associated with the Webpage; downloading, by the computer processor in a specified order, the files from the specified folder; second analyzing, by the computer processor based on the search command, the files associated with the Webpage; third analyzing, by the computer processor based on the search command, viewable information of the Webpage; and locating, by the computer processor based on results of the first analyzing, the second analyzing, and the third analyzing, specified information associated with the Webpage.

The present invention provides a computer program product, comprising a computer readable storage medium having a computer readable program code embodied therein, the computer readable program code comprising an algorithm that when executed by a computer processor of a computing system implements a method comprising: presenting, by the computer processor in response to a command from a user, a Webpage to the user; receiving, by the computer processor from the user, a search command for performing a search function associated with the Webpage; first analyzing, by the computer processor based on the search command, source code of the Webpage; identifying, by the computer processor, a specified folder comprising files associated with the Webpage; downloading, by the computer processor in a specified order, the files from the specified folder; second analyzing, by the computer processor based on the search command, the files associated with the Webpage; third analyzing, by the computer processor based on the search command, viewable information of the Webpage; and locating, by the computer processor based on results of the first analyzing, the second analyzing, and the third analyzing, specified information associated with the Webpage.

The present invention provides a computing system comprising a computer processor coupled to a computer-readable memory unit, the memory unit comprising instructions that when executed by the computer processor implements a method comprising: presenting, by the computer processor in response to a command from a user, a Webpage to the user; receiving, by the computer processor from the user, a search command for performing a search function associated with the Webpage; first analyzing, by the computer processor based on the search command, source code of the Webpage; identifying, by the computer processor, a specified folder comprising files associated with the Webpage; downloading, by the computer processor in a specified order, the files from the specified folder; second analyzing, by the computer processor based on the search command, the files associated with the Webpage; third analyzing, by the computer processor based on the search command, viewable information of the Webpage; and locating, by the computer processor based on results of the first analyzing, the second analyzing, and the third analyzing, specified information associated with the Webpage.

The present invention advantageously provides a simple method and associated system capable of locating data.

BRIEF DESCRIPTION OF THE DRAWINGS

FIG. 4 illustrates a screen shot of source code associated with a Webpage, in accordance with embodiments of the present invention.

DETAILED DESCRIPTION OF THE INVENTION

Figure 1:
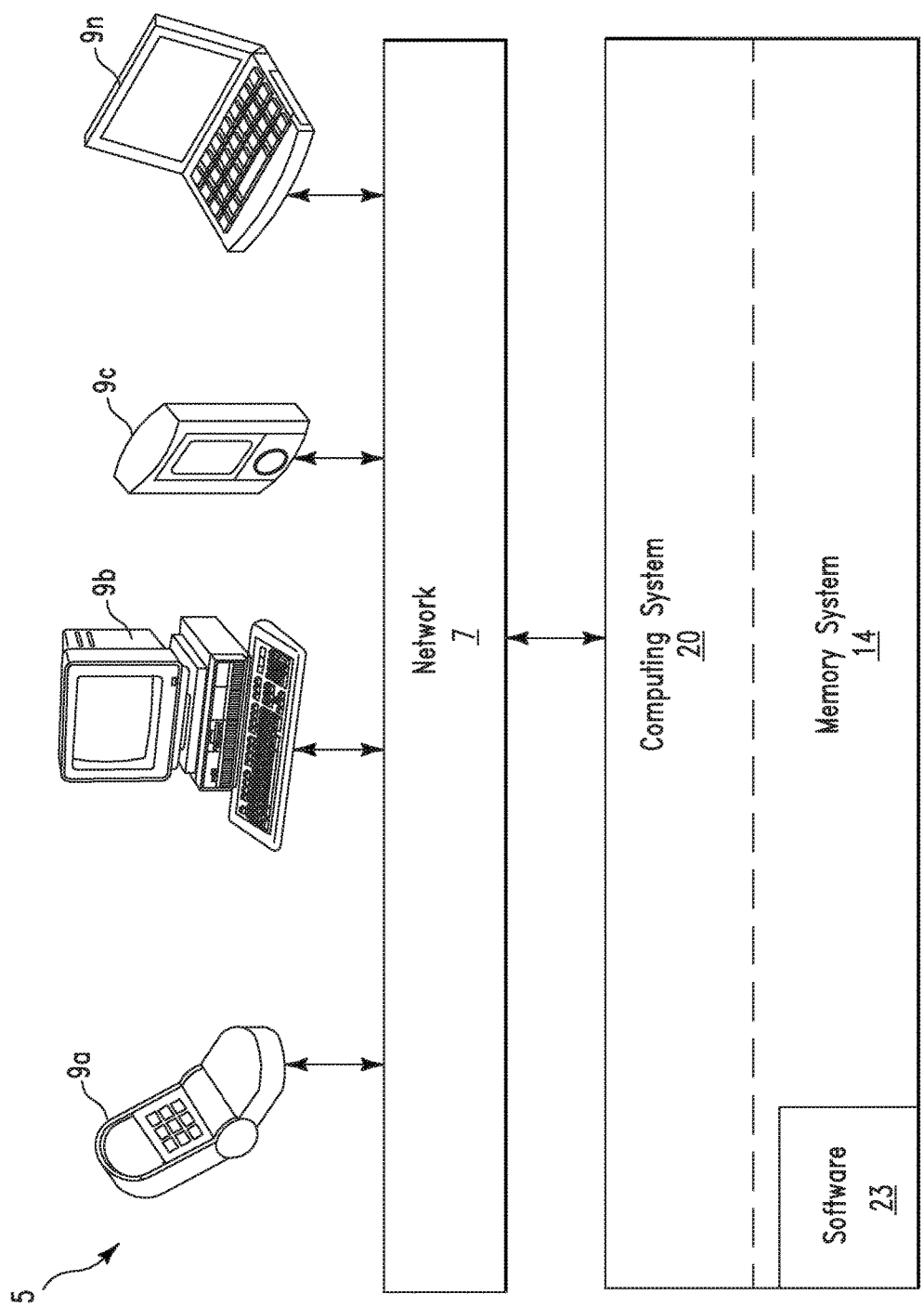
FIG. 1 illustrates a system for locating specified information associated with a Webpage(s), in accordance with embodiments of the present invention.

FIG. 1 illustrates a system 5 for locating specified information associated with a Webpage(s), in accordance with embodiments of the present invention. System 5 allows a search function (e.g., a word or phrase search/find operation) to be performed with respect to (or based on) source code and/or temporary Internet files associated with a Webpage thereby allowing a user to locate (e.g., via a highlighting process) a specified alpha/numeric sequence (e.g., text) that is not viewable or displayed on the Webpage. For example system 5 allows a user to locate a specified alpha/numeric sequence such as, inter alia:

1. Text from a dropdown menu or list box of the Webpage.
2. Description content associated with an image.
3. A value in a tooltip (i.e., a graphical user interface element).
4. Validation rules of a Webpage.

System 5 of FIG. 1 comprises devices 9a . . . 9n connected through a network 7 to a computing system 20. Devices 9a . . . 9n comprise any type of computing device capable of connecting to the Internet such as, inter alia, a computer, a PDA, a laptop computer, a tablet computer, a cellular telephone, etc. Network 7 may comprise any type of network including, inter alia, a telephone network, a local area network, (LAN), a wide area network (WAN), the Internet, a wireless network, etc. Computing system 20 may comprise any type of computing system(s) including, inter alia, a computer (PC), a server computer, a database computer, a controller, etc. Computing system 20 comprises a memory system 14. Memory system 14 may comprise a single memory system. Alternatively, memory system 14 may comprise a plurality of memory systems. Memory system 14 comprises a software application 18 for enabling a process for locating specified information associated with a Webpage(s) as follows:

1. A Webpage is accessed by a user.
2. A search operation for locating a specific keyword or phrase is enabled (by the user). For example, a Ctrl+F sequence may be enabled.
3. Software application 23 performs a search of source code (i.e., for the specific keyword or phrase) associated with the Webpage.
4. Software application 23 identifies a temporary file folder (e.g., a temporary Internet files folder) of the Webpage and downloads the files from the temporary file folder.
5. Software application 23 performs a search of the files from the temporary file folder (i.e., for the specific keyword or phrase).
6. Software application 23 performs a search of visible text (i.e., for the specific keyword or phrase) on the Webpage.
7. If the specific keyword or phrase is located, then the specific keyword or phrase is displayed and highlighted for the user. If the specific keyword or phrase is located within multiple WebPages then the specific keyword or phrase may be highlighted at different presentation levels (e.g., a font size, a font color, a font density, etc) dependent upon an association to an associated Webpage. For example, if a keyword "word" is located five times on a first Webpage and two times on a second Webpage then the keyword "word" of the first Webpage may be highlighted using a thinker font density than the keyword "word" of the second Webpage. Additionally, if the specific keyword or phrase is located within multiple WebPages, a list of URLs for Webpages (i.e., including highlighted URLs for Webpages that include the specific keyword or phrase) may be presented to the user. For example, if a search is performed for a key phrase "brakes", then a list that includes highlighted URLs for various automotive parts retailers may be presented to the user. The list of URLs may additionally include each URL (i.e., comprising the specific keyword or phrase) highlighted at different presentation levels (e.g., a font size, a font color, a font density, etc) dependent upon a number of times that the specific keyword or phrase is located in an associated Webpage.

Figure 2:
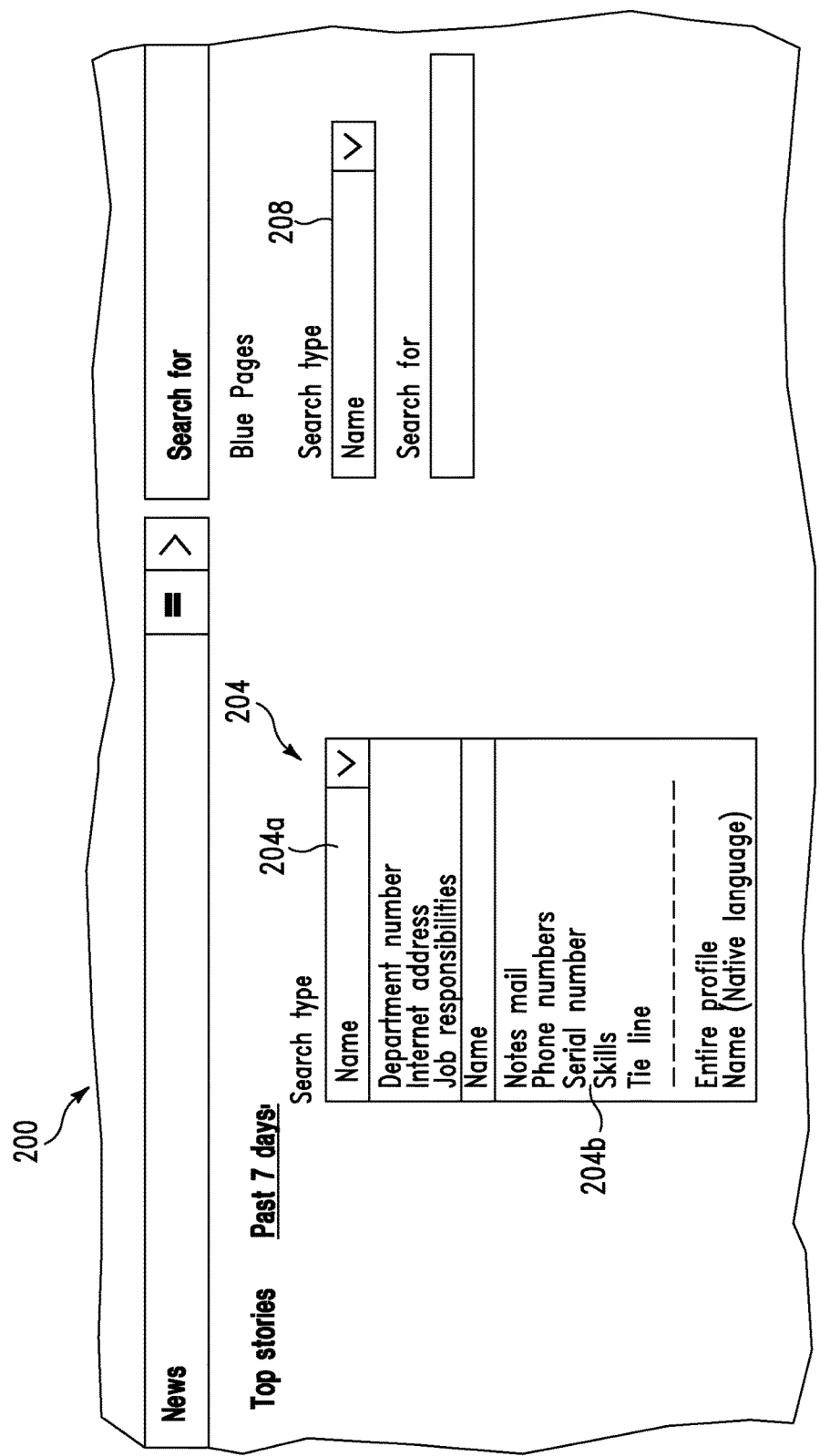
FIG. 2 illustrates a screen shot of a Webpage describing a first example scenario associated with locating a keyword in a dropdown menu, in accordance with embodiments of the present invention

FIG. 2 illustrates a screen shot 200 of a Webpage describing an example scenario associated with locating a keyword "Name" in a dropdown menu 204, in accordance with embodiments of the present invention. Screen shot 200 includes a search criteria box 208 and a dropdown menu 204. Dropdown menu 204 comprises a continuously visible portion 204a and a dropdown portion 204b (i.e., only visible during specified functions). In the example described by FIG. 2, a user has enabled a process for locating a keyword "Name". During normal functionality, dropdown portion 204b is not visible. System 5 allows the user to locate keyword "Name" in dropdown portion 204b. In order to locate keyword "Name" in dropdown portion 204b, system 5 searches source code associated with screen shot 200 of the Webpage.

Figure 3:
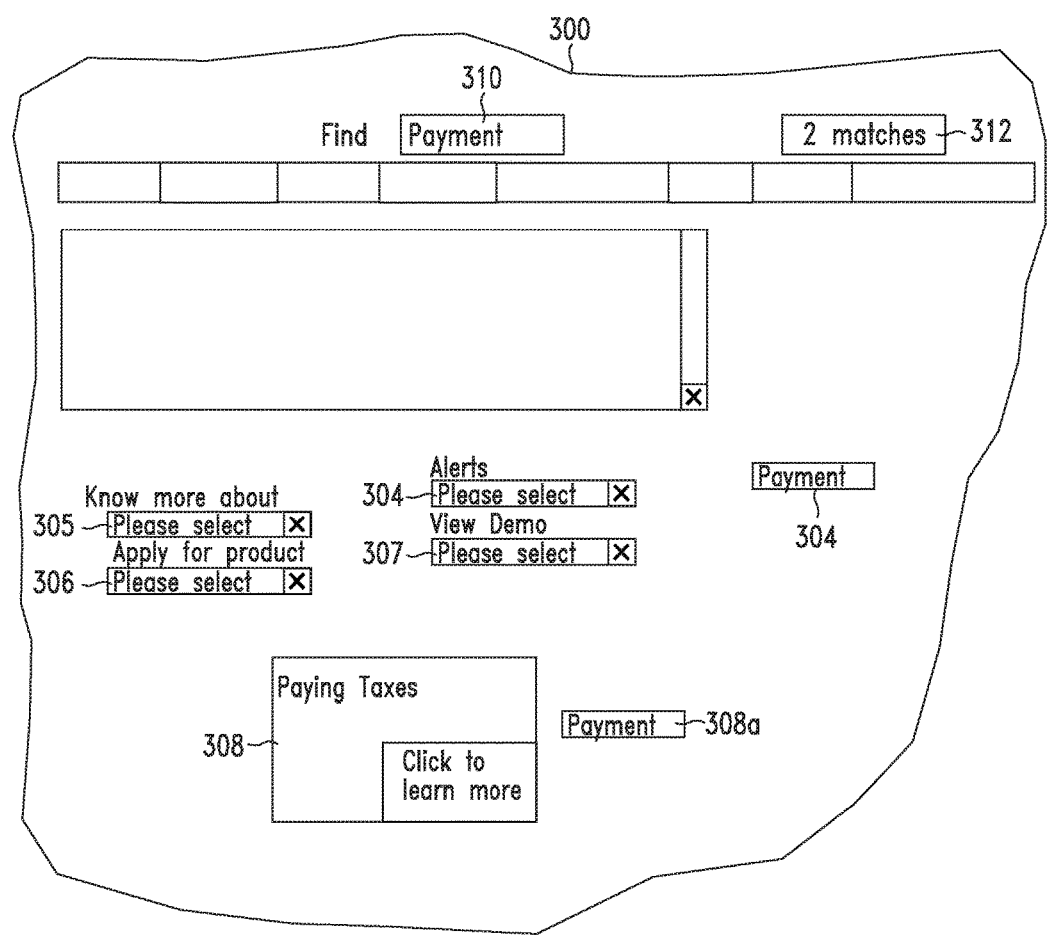
FIG. 3 illustrates a screen shot of a Webpage describing a second example scenario associated with locating a keyword, in accordance with embodiments of the present invention.

FIG. 3 illustrates a screen shot 300 of a Webpage describing an example scenario associated with locating a keyword "Payment", in accordance with embodiments of the present invention. Screen shot 300 includes a search criteria box 310, a match found box 312, dropdown menus 304, 305, 306, and 307, and an image box 308 for taking a user to another Webpage. Dropdown menu dropdown menus 304, 305, 306, and 307 comprise continuously visible portions (i.e., illustrated in FIG. 3) and dropdown portions (i.e., not illustrated in FIG. 3). Image box 308 comprises visible portions (i.e., illustrated in FIG. 3) and a non-visible portion (i.e., not illustrated in FIG. 3). In the example described by FIG. 3, a user has enabled a process for locating a keyword "Payment". During normal functionality, keyword "Payment" is not visible in either dropdown menu 304 or image box 308. System 5 allows the user to locate keyword "Payment" in dropdown menu 304 by generating a (shadow or temporary) box 304a comprising keyword "Payment". Additionally, system 5 allows the user to locate keyword "Payment" in image box 308 (i.e., the keyword "Payment" is located on another Webpage accessible by enabling portion 308) by generating a (shadow or temporary) box 308a comprising keyword "Payment". In order to locate the hidden keyword Payment" on the Webpage, system 5 searches source code and/or temporary Internet files associated with screen shot 300 of the Webpage.

FIG. 4 illustrates a screen shot 400 of source code 402 associated with a Webpage, in accordance with embodiments of the present invention. Source code 402 associated with the Webpage illustrates an example scenario associated with locating a keyword "phone". The keyword "phone" comprises a highlight 404 (i.e., in source code 402 and in the associated Webpage not illustrated in FIG. 4).

Figure 5:
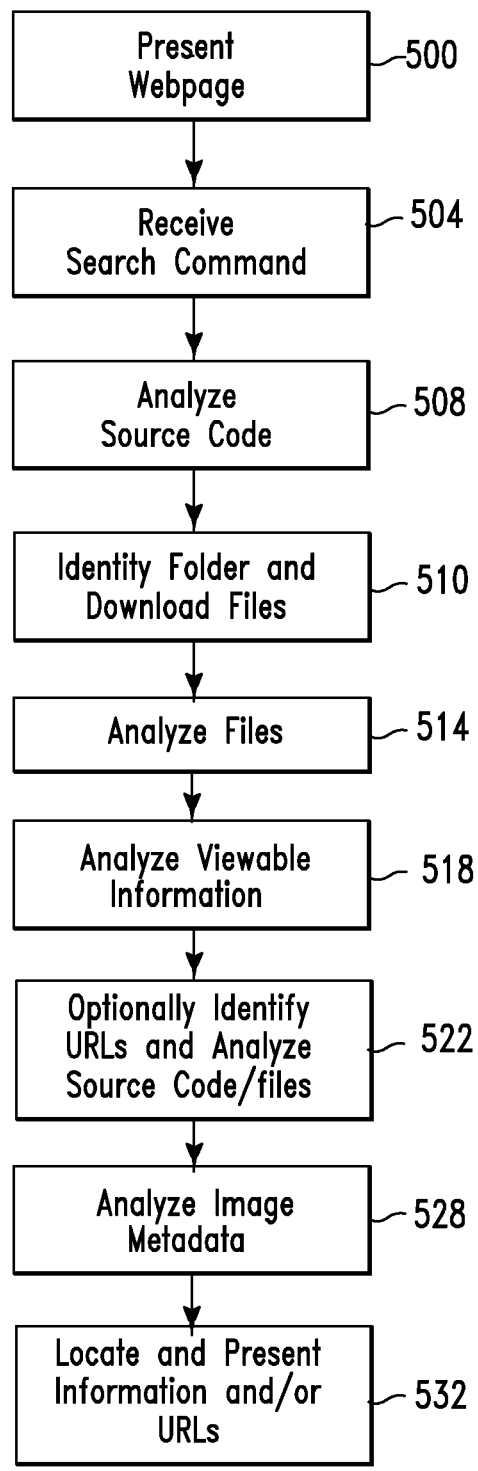
FIG. 5 illustrates an algorithm used by the system of FIG. 1 for implementing a process for locating specified information associated with a Webpage(s), in accordance with embodiments of the present invention.

FIG. 5 illustrates an algorithm used by system 5 of FIG. 1 for implementing a process for locating specified information associated with a Webpage(s), in accordance with embodiments of the present invention. In step 500, a computer processor (i.e., of a computing system such as, inter alia, computing system 20 of FIG. 1) presents (in response to a command from a user) a Webpage to the user. In step 504, the computer processor receives (i.e., from the user) a search command for performing a search function associated with the Webpage. For example, the user may issue a command for search for a specified word or phrase associated with the Webpage and/or related WebPages. In step 508, the computer processor analyzes (based on the search command issued in step 504) source code of the Webpage (e.g., looking for a specified word, phrase, or video file/image). Additionally, the computer processor may analyze source code of any related WebPages (e.g., hyperlinked or referred to in the original Webpage). In step 510, the computer processor identifies a folder(s) comprising files associated with the Webpage(s) and downloads (in a specified order) the files. The files may include any type of file associated with a Webpage including, inter alia, temporary Internet files, cookies, etc. In step 514, the computer processor analyzes (e.g., looking for a specified word, phrase, or video file/image) the files downloaded in step 510. In step 518, the computer processor analyzes (e.g., looking for a specified word, phrase, or video file/image) viewable information of the Webpage (e.g., any visible text on a computer monitor presenting the Webpage(s)). In step 522, the computer processor optionally identifies a uniform resource locators (URL) associated with the Webpage(s) (e.g., associated with a specified word, phrase, or video file/image). The URLs may be located in the source code and/or temporary Internet files of the Webpage(s). In step 528, the computer processor analyzes (e.g., looking for a specified word, phrase, or video file/image) image metadata for an image(s) of the Webpage(s). In step 532, the computer processor locates and presents (i.e., based on results of steps 504-528) a various levels, specified information and/or URLs comprising links to the specified information associated with the Webpage(s).

Figure 6:
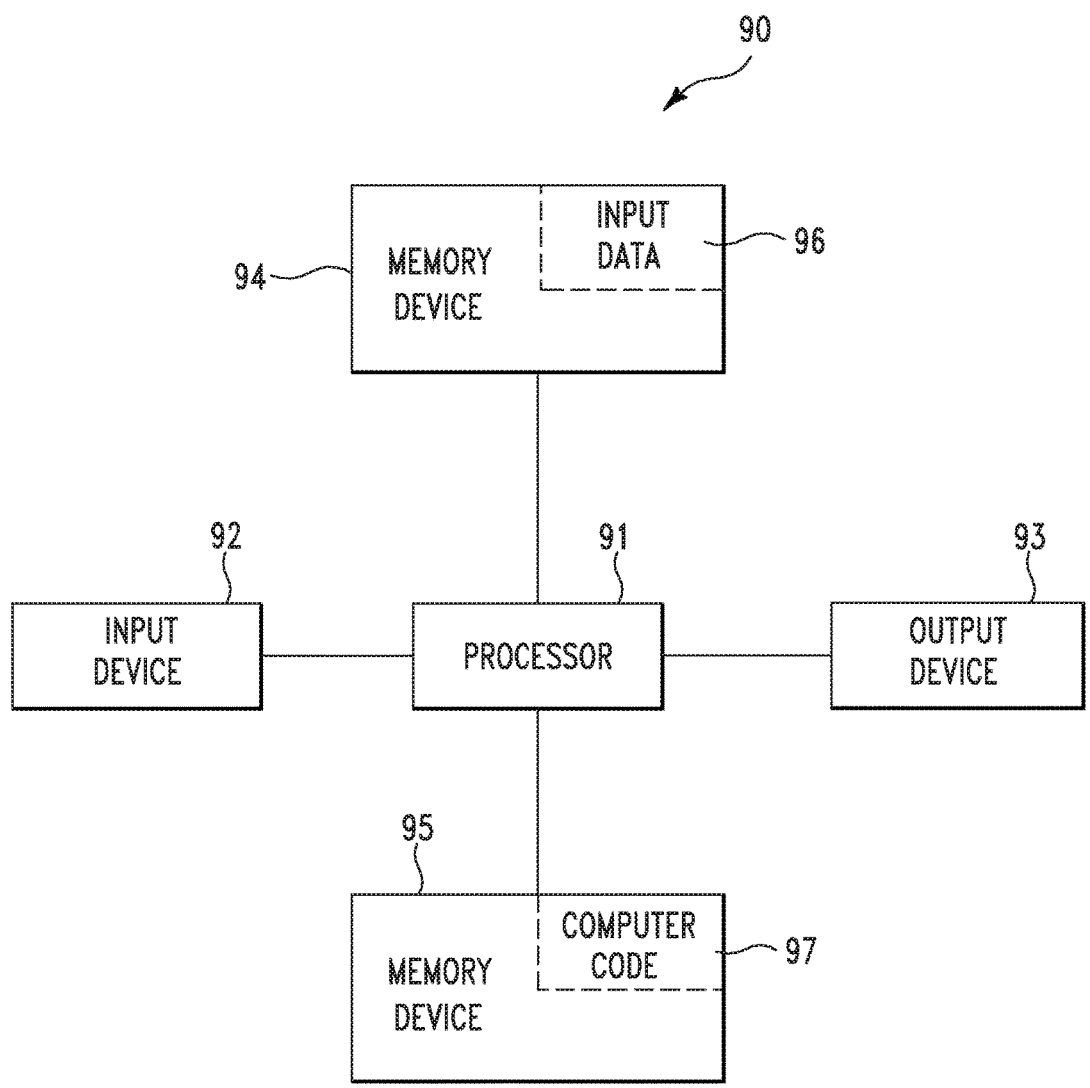
FIG. 6 illustrates a computer apparatus used for locating specified information associated with a Webpage(s), in accordance with embodiments of the present invention.

FIG. 6 illustrates a computer apparatus 90 (e.g., computing system 20 of FIG. 1) used for locating specified information associated with a Webpage(s), in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 5) for locating specified information associated with a Webpage(s). The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 6) may comprise the algorithm of FIG. 5 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service provider who offers to locate specified information associated with a Webpage(s). Thus the present invention discloses a process for deploying, creating, integrating, hosting, maintaining, and/or integrating computing infrastructure, comprising integrating computer-readable code into the computer system 90, wherein the code in combination with the computer system 90 is capable of performing a method for locating specified information associated with a Webpage(s). In another embodiment, the invention provides a method that performs the process steps of the invention on a subscription, advertising, and/or fee basis. That is, a service provider, such as a Solution Integrator, could offer to locate specified information associated with a Webpage(s). In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 6 shows the computer system 90 as a particular configuration of hardware and software, any configuration of hardware and software, as would be known to a person of ordinary skill in the art, may be utilized for the purposes stated supra in conjunction with the particular computer system 90 of FIG. 6. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A non-viewable Webpage information search method comprising:

presenting, by a computer processor of a computing system in response to a command from a user, a Webpage to said user via a device of said user, wherein said device differs from said computing system;

enabling, by said processor in response to an input device enabled control sequence, a specified code enabled search operation;

first analyzing, by said computer processor based on a search command, for locating non-viewable data of said Webpage, received from said user via a search criteria input box of said webpage generated via execution of said specified code enabled search operation, source code of said Webpage, wherein said source code comprises computer code executed for building said Webpage;

downloading from said device, by said computer processor in a specified order, temporary Internet files associated with said Webpage from a specified folder;

second analyzing, by said computer processor based on said search command, said temporary Internet files associated with said Webpage from said specified folder;

third analyzing, by said computer processor based on said search command, viewable information of said Webpage; and locating, by said computer processor based on results of said first analyzing, said second analyzing, and said third analyzing, specified information associated with said Webpage, wherein said specified information comprises an alpha/numeric sequence that is not viewable or displayed on said Webpage, and wherein said alpha/numeric sequence is located within: a hidden portion of a dropdown menu of the Webpage, descriptive content associated with an image of the Webpage, a graphical user interface element of the Webpage, an additional Webpage accessible by said Webpage, and validation rules of the Webpage;

identifying, by said computer processor, a first uniform resource locator (URL) associated with said Webpage;

identifying, by said computer processor, a second URL associated with said additional Webpage, said second URL located within said source code of said Webpage;

fourth analyzing, by said computer processor based on said search command, additional source code of said additional Webpage, wherein said locating is further based on results of said fourth analyzing, wherein said specified information is comprised by said Webpage and said additional Webpage, wherein said Webpage comprises a first group of instances of said specified information, wherein said additional Webpage comprises a second group of said instances of said specified information, and wherein said first group comprises a greater number of said instances than said second group of said instances;

presenting, by said computer processor to said user via a match found box, a single value indicating a number of located matches of said specified information on said Webpage and said additional Webpage;

generating and presenting, by said processor, for each located match, a temporary box on the Webpage presenting said located match of said non-viewable data;

presenting, by said computer processor for said user, said first group at a first presentation level, comprising a first specified font size, font color, and font density, indicating that said first group comprises said greater number of said instances than said second group of said instances;

presenting, by said computer processor for said user, said first URL at said first presentation level indicating that said first group comprises a greater number of said instances than said second group of said instances;

presenting, by said computer processor for said user, said second group of instances at a second presentation level, comprising a second specified font size, font color, and font density, indicating that said second group comprises a lesser number of said instances than said first group;

presenting, by said computer processor for said user, said second URL at said second presentation level indicating that said second group comprises said lesser number of said instances than said first group, wherein each of said first presentation level and said second presentation level are selected from the group consisting of a font size, a font color, and a font density;

executing, by said processor, a computer code executed Web search via execution of said source code and said additional source code with respect to said first URL and said second URL;

deploying, integrating, and maintaining, by said computer processor based on results of said locating, said Webpage with respect to said additional Webpage such that a computing infrastructure is created for hosting and integrating said Webpage with said additional Webpage; and presenting, by said processor, said first URL and said second URL to said user, wherein said first URL and said second URL are associated with a specified retailer.

2. The method of claim 1, wherein said specified information comprises video files/images comprised by said Webpage and said additional Webpage, wherein said Webpage comprises first video files/images of said video files/images, wherein said additional Webpage comprises second video files/images of said video files/images, wherein said first video files/images comprise more video files/images than said second video files/images, wherein said first presentation level indicates that said first video files/images comprise more video/image objects than said second video files/images, and wherein said second presentation level indicates that said second video files/images comprise less video/image objects than said first video files/images.

3. The method of claim 1, wherein said search command comprises inputting a specified keyword/phrase associated with said Webpage.

4. The method of claim 1, further comprising:
identifying, by said computer processor, parental controls associated with said source code and said temporary Internet files, wherein said locating is further based on results of said identifying said parental controls.

5. The method of claim 1, wherein said specified information comprises hidden text from said Webpage.

6. The method of claim 1, wherein said specified information comprises an image associated with said Webpage.

7. The method of claim 1, said specified information comprises an object within an image, a video file, or an audio file, and wherein said method further comprises:
fourth analyzing, by said computer processor based on said search command, metadata of said specified information, wherein said locating is further based on results of said fourth analyzing.

8. The method of claim 1, wherein said specified information comprises text from a list box of said Webpage and a cascaded combo box of said Webpage.

9. The method of claim 1, wherein said first analyzing comprises locating text associated with said search command within said source code of said Webpage.

10. The method of claim 1, further comprising:
fifth analyzing, by said computer processor based on said search command, source code of an additional Webpage differing from said Webpage;
identifying, by said computer processor, an additional specified folder comprising additional files associated with said additional Webpage;
sixth analyzing, by said computer processor based on said search command, said additional files associated with said additional Webpage; and
locating, by said computer processor based on results of said first analyzing, said second analyzing, said third analyzing, said fourth analyzing, said fifth analyzing, and said sixth analyzing, alternative information associated with said Webpage and said additional Webpage.

11. The method of claim 1, further comprising:
providing at least one support service for at least one of creating, integrating, hosting, maintaining, and deploying computer-readable code in said computing system, wherein the code in combination with the computing system is capable of performing: said presenting said Webpage, said first analyzing, said second analyzing, said third analyzing, said locating, said identifying said first URL, said identifying said second URL, said fourth analyzing, said presenting said single value, said presenting said first group, said presenting said first URL, said presenting said second group, and said presenting said second URL.

12. A computer program product, comprising a computer readable hardware storage device storing a computer readable program code, said computer readable program code comprising an algorithm that when executed by a computer processor of a computing system implements a non-viewable Webpage information search method comprising:
presenting, by said computer processor in response to a command from a user, a Webpage to said user via a device of said user, wherein said device differs from said computing system;
enabling, by said processor in response to an input device enabled control sequence, a specified code enabled search operation;
first analyzing, by said computer processor based on a search command, for locating non-viewable data of said Webpage, received from said user via a search criteria input box of said webpage generated via execution of said specified code enabled search operation, source code of said Webpage, wherein said source code comprises computer code executed for building said Webpage;

downloading from said device, by said computer processor in a specified order, temporary Internet files associated with said Webpage from a specified folder;

second analyzing, by said computer processor based on said search command, said temporary Internet files associated with said Webpage from said specified folder;

third analyzing, by said computer processor based on said search command, viewable information of said Webpage; and locating, by said computer processor based on results of said first analyzing, said second analyzing, and said third analyzing, specified information associated with said Webpage, wherein said specified information comprises an alpha/numeric sequence that is not viewable or displayed on said Webpage, and wherein said alpha/numeric sequence is located within: a hidden portion of a dropdown menu of the Webpage, descriptive content associated with an image of the Webpage, a graphical user interface element of the Webpage, an additional Webpage accessible by said Webpage, and validation rules of the Webpage;

identifying, by said computer processor, a first uniform resource locator (URL) associated with said Webpage;

identifying, by said computer processor, a second URL associated with said additional Webpage, said second URL located within said source code of said Webpage;

fourth analyzing, by said computer processor based on said search command, additional source code of said additional Webpage, wherein said locating is further based on results of said fourth analyzing, wherein said specified information is comprised by said Webpage and said additional Webpage, wherein said Webpage comprises a first group of instances of said specified information, wherein said additional Webpage comprises a second group of said instances of said specified information, and wherein said first group comprises a greater number of said instances than said second group of said instances;

presenting, by said computer processor to said user via a match found box, a single value indicating a number of located matches of said specified information on said Webpage and said additional Webpage;

generating and presenting, by said processor, for each located match, a temporary box on the Webpage presenting said located match of said non-viewable data;

presenting, by said computer processor for said user, said first group at a first presentation level, comprising a first specified font size, font color, and font density, indicating that said first group comprises said greater number of said instances than said second group of said instances;

presenting, by said computer processor for said user, said first URL at said first presentation level indicating that said first group comprises a greater number of said instances than said second group of said instances;

presenting, by said computer processor for said user, said second group of instances at a second presentation level, comprising a second specified font size, font color, and font density, indicating that said second group comprises a lesser number of said instances than said first group;

presenting, by said computer processor for said user, said second URL at said second presentation level indicating that said second group comprises said lesser number of said instances than said first group, wherein each of said first presentation level and said second presentation level are selected from the group consisting of a font size, a font color, and a font density;

executing, by said processor, a computer code executed Web search via execution of said source code and said additional source code with respect to said first URL and said second URL;

deploying, integrating, and maintaining, by said computer processor based on results of said locating, said Webpage with respect to said additional Webpage such that a computing infrastructure is created for hosting and integrating said Webpage with said additional Webpage; and presenting, by said processor, said first URL and said second URL to said user, wherein said first URL and said second URL are associated with a specified retailer.

13. The computer program product of claim 12, wherein said specified information comprises video files/images comprised by said Webpage and said additional Webpage, wherein said Webpage comprises first video files/images of said video files/images, wherein said additional Webpage comprises second video files/images of said video files/images, wherein said first video files/images comprise more video files/images than said second video files/images, wherein said first presentation level indicates that said first video files/images comprise more video/image objects than said second video files/images, and wherein said second presentation level indicates that said second video files/images comprise less video/image objects than said first video files/images.

14. The computer program product of claim 12, wherein said search command comprises inputting a specified keyword/phrase associated with said Webpage.

15. The computer program product of claim 12, wherein said method further comprises:
identifying, by said computer processor, parental controls associated with said source code and said temporary Internet files, wherein said locating is further based on results of said identifying said parental controls.

16. The computer program product of claim 12, wherein said specified information comprises hidden text from said Webpage.

17. The computer program product of claim 12, wherein said specified information comprises an image associated with said Webpage.

18. The computer program product of claim 12, said specified information comprises an object within an image, a video file, or an audio file, and wherein said method further comprises:
fourth analyzing, by said computer processor based on said search command, metadata of said specified information, wherein said locating is further based on results of said fourth analyzing.

19. A computing system comprising a computer processor coupled to a computer-readable memory unit, said memory unit comprising instructions that when executed by the computer processor implements a non-viewable Webpage information search method comprising:
presenting, by said computer processor in response to a command from a user, a Webpage to said user via a device of said user, wherein said device differs from said computing system;

enabling, by said processor in response to an input device enabled control sequence, a specified code enabled search operation;

first analyzing, by said computer processor based on a search command, for locating non-viewable data of said Webpage, received from said user via a search criteria input box of said webpage generated via execution of said specified code enabled search operation, source code of said Webpage, wherein said source code comprises computer code executed for building said Webpage;

downloading from said device, by said computer processor in a specified order, temporary Internet files associated with said Webpage from a specified folder;

second analyzing, by said computer processor based on said search command, said temporary Internet files associated with said Webpage from said specified folder;

third analyzing, by said computer processor based on said search command, viewable information of said Webpage; and locating, by said computer processor based on results of said first analyzing, said second analyzing, and said third analyzing, specified information associated with said Webpage, wherein said specified information comprises an alpha/numeric sequence that is not viewable or displayed on said Webpage, and wherein said alpha/numeric sequence is located within: a hidden portion of a dropdown menu of the Webpage, descriptive content associated with an image of the Webpage, a graphical user interface element of the Webpage, an additional Webpage accessible by said Webpage, and validation rules of the Webpage;

identifying, by said computer processor, a first uniform resource locator (URL) associated with said Webpage;

identifying, by said computer processor, a second URL associated with said additional Webpage, said second URL located within said source code of said Webpage;

fourth analyzing, by said computer processor based on said search command, additional source code of said additional Webpage, wherein said locating is further based on results of said fourth analyzing, wherein said specified information is comprised by said Webpage and said additional Webpage, wherein said Webpage comprises a first group of instances of said specified information, wherein said additional Webpage comprises a second group of said instances of said specified information, and wherein said first group comprises a greater number of said instances than said second group of said instances;

presenting, by said computer processor to said user via a match found box, a single value indicating a number of located matches of said specified information on said Webpage and said additional Webpage;

generating and presenting, by said processor, for each located match, a temporary box on the Webpage presenting said located match of said non-viewable data;

presenting, by said computer processor for said user, said first group at a first presentation level, comprising a first specified font size, font color, and font density, indicating that said first group comprises said greater number of said instances than said second group of said instances;

presenting, by said computer processor for said user, said first URL at said first presentation level indicating that said first group comprises a greater number of said instances than said second group of said instances;

presenting, by said computer processor for said user, said second group of instances at a second presentation level, comprising a second specified font size, font color, and font density, indicating that said second group comprises a lesser number of said instances than said first group;

presenting, by said computer processor for said user, said second URL at said second presentation level indicating that said second group comprises said lesser number of said instances than said first group, wherein each of said first presentation level and said second presentation level are selected from the group consisting of a font size, a font color, and a font density;

executing, by said processor, a computer code executed Web search via execution of said source code and said additional source code with respect to said first URL and said second URL;

deploying, integrating, and maintaining, by said computer processor based on results of said locating, said Webpage with respect to said additional Webpage such that a computing infrastructure is created for hosting and integrating said Webpage with said additional Webpage; and presenting, by said processor, said first URL and said second URL to said user, wherein said first URL and said second URL are associated with a specified retailer.

* * * * *